April 18, 1939.  A. E. A. S. CORNELIUS  2,154,439
METHOD FOR PREPARING ALKALI SALTS
Filed April 29, 1936 4 Sheets-Sheet 1
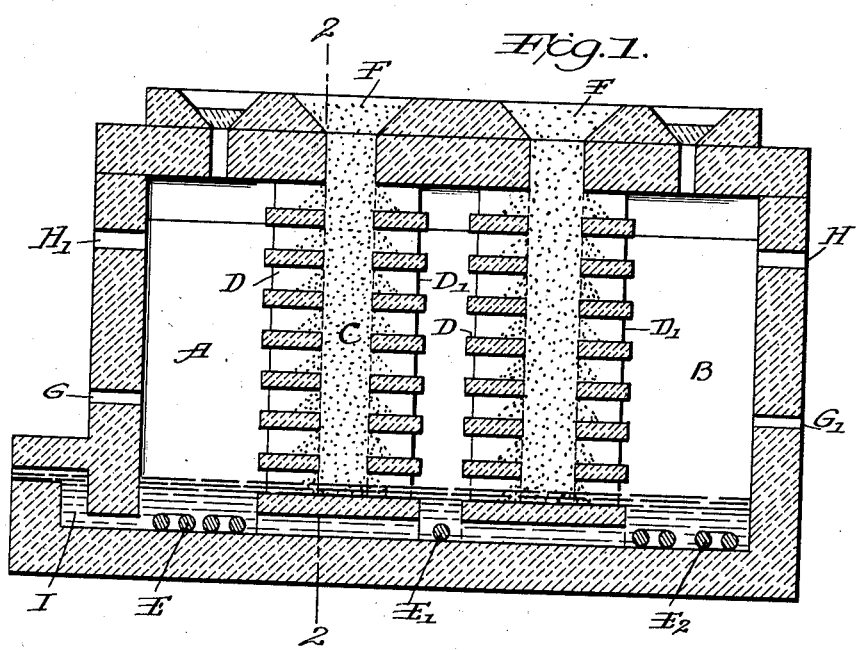
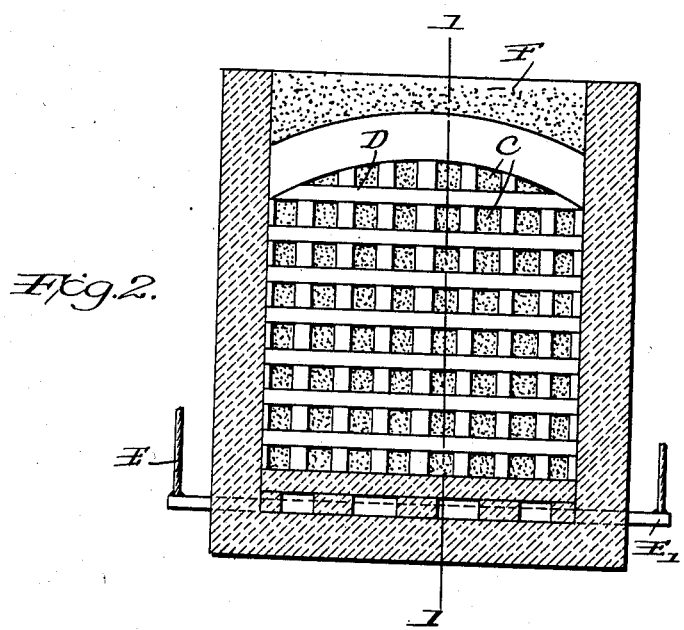
Inventor
Anders E. A. S. Cornelius
By Cushman Darby & Cushman
Attorneys April 18, 1939. A. E. A. S. CORNELIUS 2,154,439
METHOD FOR PREPARING ALKALI SALTS
Filed April 29, 1936 4 Sheets-Sheet 2
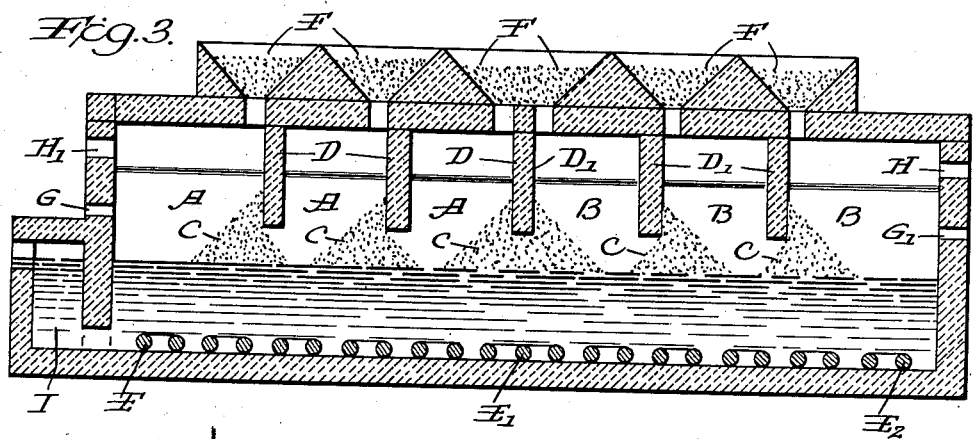
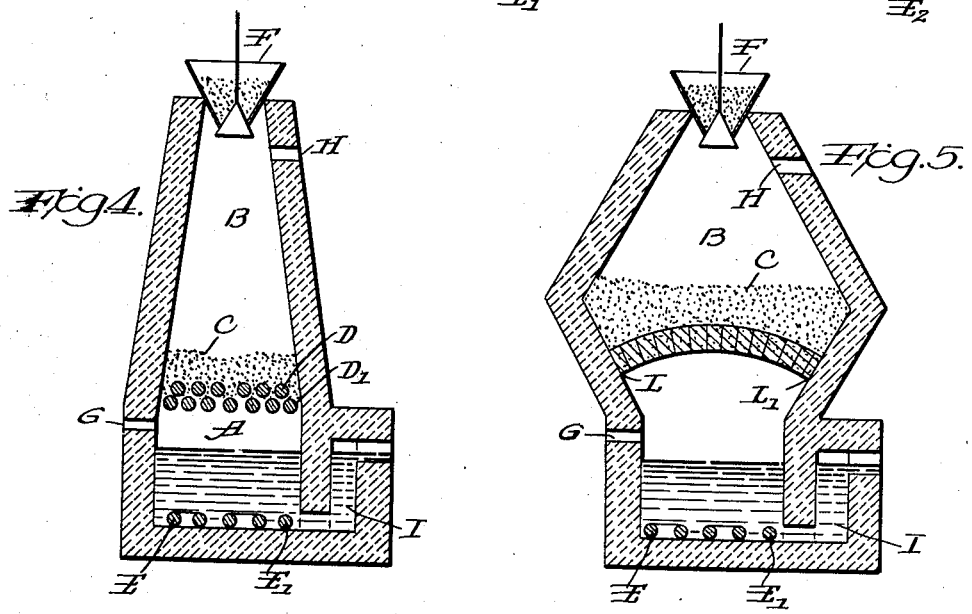
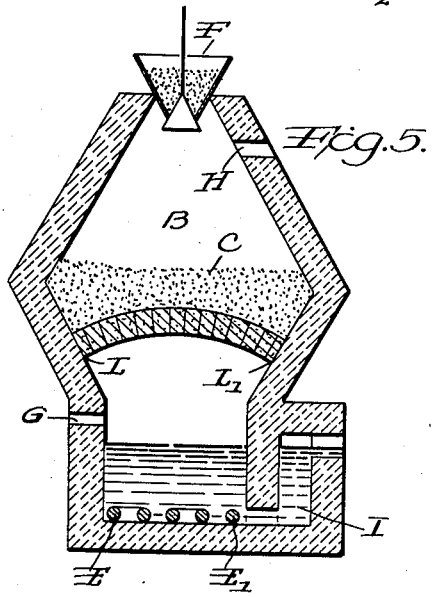
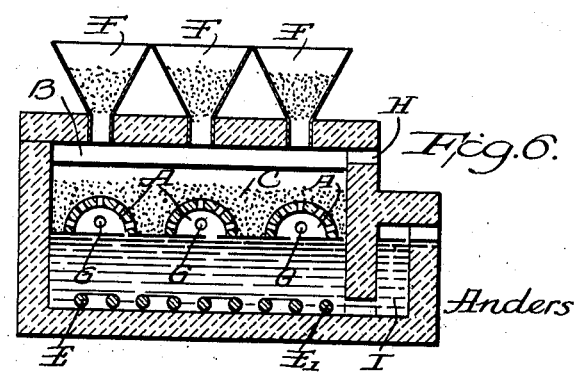

April 18, 1939. A. E. A. S. CORNELIUS 2,154,439
METHOD FOR PREPARING ALKALI SALTS
Filed April 29, 1936  4 Sheets-Sheet 4

Inventor
Anders E. A. S. Cornelius
By Cushman Darby & Cushman
Attorneys

Patented Apr. 18, 1939

2,154,439

UNITED STATES PATENT OFFICE 2,154,439

METHOD FOR PREPARING ALKALI SALTS

Anders E. A. S. Cornelius, Baltimore, Md., assignor to Crown Cork & Seal Company, Inc., a corporation of New York Application April 29, 1936, Serial No. 77,061
In Norway May 1, 1935

4 Claims. (Cl. 23—52)

This invention relates to a process and apparatus for carrying out reactions wherein there is involved a gas, a liquid and a solid. This type of reaction is exemplified, for example, by the reaction of an alkali chloride, silicon dioxide and water vapor for the preparation of alkali silicates and hydrochloric acid.

An important feature of the present invention and one which contributes materially to the speed of reaction and an enhanced yield therefrom, i. e., results in a rapid commercially feasible, plant practice, whereby, for example, quantities of sodium silicate are efficiently produced, resides in presenting the solid material as a membrane and providing on one side of this membrane a gas delivery space and heating chamber communicating directly with the membrane substantially throughout the interfacial surfaces of the chamber and membrane.

The advantage of this process and structure is that it permits the gas to contact and to enter and permeate the membrane directly throughout the area of the membrane and will be even better appreciated when it is understood that the success of the reaction depends upon intimate contact of the gaseous and solid reaction materials. Hence, by eliminating any intermediate means or obstacles between the gas delivery chamber and the membrane, and thereby presenting the gaseous medium to the permeable membrane over its entire area, the intimate contact so necessary is obtained. Moreover, heating conditions necessary for the reaction are efficiently uniformly preserved and controlled and in this connection, the gas delivery chamber affords a means for continuously heating the gas and presenting it under optimum reaction conditions to the membrane of solid material and likewise heating the membrane to reaction temperatures to assure that the reaction will be rapid, efficient and complete.

I have mentioned the preparation of sodium silicate purely as illustrative of the wide usefulness of the invention and it will be understood, that in practicing the process, other reactions of different materials to provide a variety of products may be practiced. For example, in accordance with the present invention, I make zincates, ferrites, manganates, aluminates, borates, phosphates and also produce polysilicates or complex or mixed salts or silicates.

In view of the wide ramifications of the invention, I will describe the production of sodium silicate from sodium chloride and silicon oxide using water vapor. In this connection, other gases such as air, steam, oxygen or hydrogen may be used to promote the reaction, and suitable substances which give up oxygen of which many are well known, as well as compounds, which give up hydrogen, for example, methane, may be employed. In other words, I employ hydrogen and oxygen containing gases capable of entering into the reaction for producing the desired product.

In the manufacture of sodium silicate by way of example, from sodium chloride, silicon dioxide and water vapor, the reaction proceeds generally as follows:

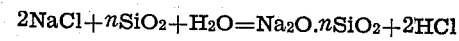
$$2NaCl + nSiO_2 + H_2O = Na_2O \cdot nSiO_2 + 2HCl$$

The earlier attempts which have been made to utilize this reaction have not been commercially practicable. The difficulties of controlling such an active reaction that the process becomes technically and economically feasible, are attributable to several causes. Thus, the reaction takes place between a solid, powdered substance (silicon dioxide, $SiO_2$, or sand), a liquid substance (alkali chloride NaCl), and a gaseous substance (water vapor). In order that a reaction may be brought about, it is required that these substances come in intimate contact with each other. It is a question therefore of so finely dividing the water vapor that it is present everywhere in the melt, whence particles of sand or silicon dioxide can simultaneously come in contact with both the chloride and the water vapor. To produce such a homogeneous mixture from the substances involved would seem to be practically impossible. The reaction occurs only between particles of the substances colliding accidentally, and it would be naturally assumed that the yield must be very small. It has therefore been proposed, in order to increase the yield, to conduct the reaction on a very large furnace surface, but, as the reaction requires a temperature of 1100° C. or more, it can easily be seen that such great losses of heat and chloride would result that the economy of the process would be jeopardized.

In order to provide a thorough practicable process capable of being used commercially with an enhanced yield of sodium silicate, I have discovered that the solid mixture of chloride and silicon dioxide should be presented as a membrane permeable over its entire area by the gas or gas mixture contained in a substantially coextensive, juxtaposed gas delivery and heating space. This solution of the problem is based on the following observations.

If an oxide, e. g., silicon dioxide (sand), whose positive component, besides oxygen, constitutes the negative radical in an alkali salt, which is to be prepared, such as sodium silicate, is heated in molten alkali chloride with an excess of chloride, and water vapor and/or air, hydrogen or oxygen are injected into or above the melt, the appearance of the silicon oxide is changed, for in a very short time it seems to grow and form a continuous crystal skeleton, which is extremely voluminous and whose combined surface is thus very large. Its volume may become more than 3 to 4 times the original volume of the sand.

I have further observed that the skeleton avidly absorbs molten alkali chloride by reason of its great porosity. The formation of this skeleton, as the oxide is composed of $SiO_2$, and as it seems to consist chiefly of a silicate with a very high silicon dioxide content, can be explained in the following manner:

At high temperatures the reaction takes place between alkali chloride and water vapor in which small quantities of hydrogen chloride and alkali hydroxide are formed, analogous to that which occurs, for example, in the treatment of magnesium chloride with water vapor. If the alkali chloride involved consists of sodium chloride, I obtain the following equilibrium equation:

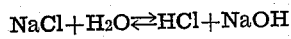

$$NaCl + H_2O \rightleftharpoons HCl + NaOH$$

The position of equilibrium is strongly displaced to the left at the temperatures here concerned, i. e., 1100° C., for which reason extremely small quantities of NaOH are formed. If, however, only traces of hydroxide have been formed, the reaction continues very readily. The small quantities of alkali hydroxide formed in the foregoing manner easily dissolve in the chloride and react with the silicon dioxide, so that the above-mentioned crystal skeleton results. As the silicon dioxide in the melt has in this way obtained a surface several times larger, a reaction can more easily occur between the oxide, the chloride and the water vapor. I have further found that an increased yield is obtained from the reaction, if the excess of chloride is removed, after the skeleton is formed. It is desirable to remove the excess, since so much chloride adheres to the skeleton that this quantity is sufficient to form the desired silicate by combining with the silicon dioxide. The excess chloride in melted state is therefore allowed to flow from the skeleton to a silicate bath, and forms a coating protecting the silicate from reaction with gases such as hydrochloric and also forms a source of chloride vapor for use in the reaction to form the silicate.

I have referred to the use of a membrane, and by membrane, I mean a wall or charge which, in effect, forms a barrier or layer. This membrane may consist of silicon oxide alone or a mixture of silicon oxide and sodium chloride. It is so disposed relative to the gas receiving space on one side thereof, that the steam and sodium chloride vapor or steam alone are caused to contact or enter the membrane substantially throughout its area without obstruction. It is this direct presentation of the gas to the membrane which affords a complete and rapid reaction and enables a large yield of sodium silicate to be obtained. The charge or wall and the gas or gas mixture are heated to a temperature of about 1100° C., although a range of substantially 950° C. to 1500° C. may be practiced for the reaction. The hydrochloric acid which is produced may be recovered and used as desired, while provision is made for condensing any of the excess sodium chloride vapors, whence they may be returned to the system. The sodium silicate, as produced, flows away from the charge and constitutes a bath which is heated by suitable electrodes and, in some cases, the sodium chloride may be floated on this bath for the purpose of vaporizing it. The heating of the bath by electrodes immersed therein serves to heat the furnace and the charge or membrane, as well as the steam, air, oxygen or hydrogen, or gases containing the same, to the required reaction temperature; the temperature of the gas presented to the membrane serves also to assure that the reaction will take place at the required temperature in that the gas or gas mixture will heat and maintain the constituent or constituents of the membrane at optimum temperature for reaction. The process is continuous, the charge or wall of solid material being replaced to take care of losses due to formation and removal of the sodium silicate and the gas or gas mixture being continuously supplied from the gas delivery chamber.

The process is so conducted in practice that the water vapor is introduced into a furnace, suitably electrically heated, consisting of two or more chambers, of which that or those on one side of the membrane, into which the water vapor is introduced, are heated, while the other or others on the other side are cooled, in order to serve as a condenser for the excess chloride vapors which have not participated in the reaction in the heated chamber. In the heating chamber the water vapor is mixed with alkali chloride vapors and compelled to pass directly through the walls, consisting of sand or sand and alkali chloride, which, as membranes or barriers, separate the various chambers. These charge walls are transformed under the action of the vapor to the silicon dioxide skeleton, as well as to silicate, and the latter melts and descends to the bottom of the furnace, from which the silicate is removed intermittently or continuously. A fresh charge is supplied in proportion as the silicate melts away. The condensed alkali chloride flows back to the heating chamber and thus circulates.

The temperature in the heating section is maintained at about 1100° C. The condenser section is maintained at a temperature which is somewhat higher than the melting point of the respective alkali chlorides but low enough to condense the chloride vapors.

The process may also be conducted so that the direction of the gasses or vapors is reversed, and the heating section thus becomes the condenser section and vice versa.

To elucidate the invention, several embodiments of the process and apparatus will be described, for making sodium silicate, although as stated, the invention is similarly practiced for making various salts.

In the drawings:

Figure 1 shows a transverse section of a furnace for conducting the process,

Figure 2 shows the same furnace in a longitudinal section,

Figure 7:
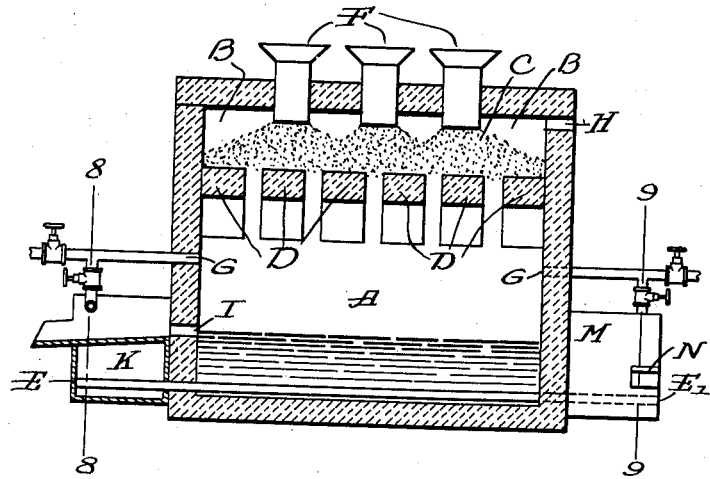
Figure 8:
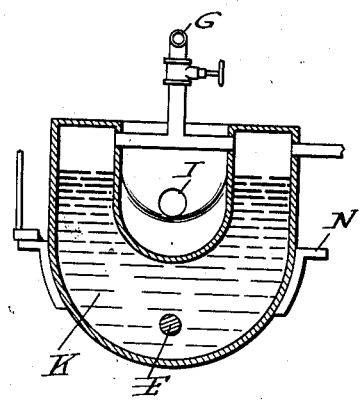
Figure 9:
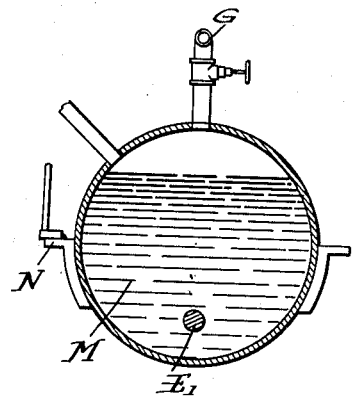
Figure 10:
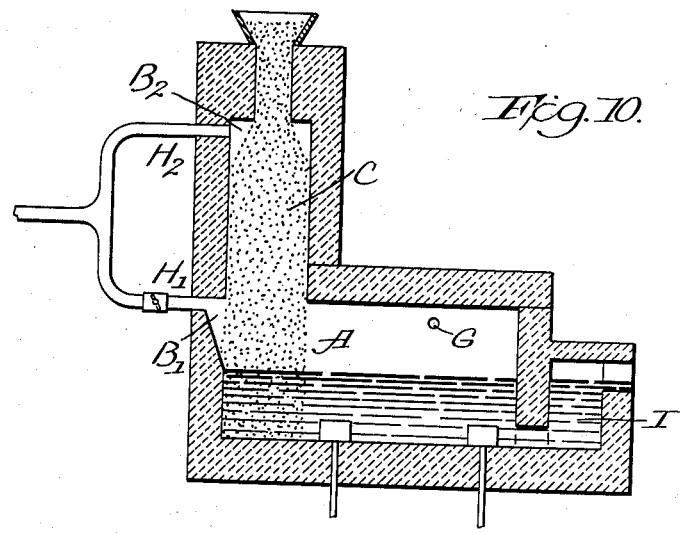
Figure 11:
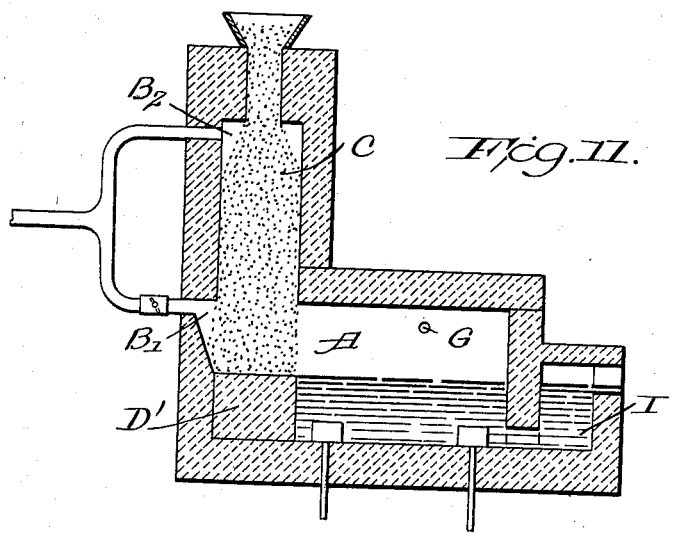

Figures 3, 4, 5, 6 and 7 show sectional views of further types of furnaces for conducting the process, Figure 8 is a sectional view on the line 7—7 of Figure 7, Figure 9 is a sectional view on the line 7'—7' of Figure 7, Figure 10 is a section of another form of apparatus, and Figure 11 is a similar view showing a shelf or vault for the charge.

Referring to Figures 1 and 2, the furnace is divided into two chambers A and B by brick frameworks D and D'. The intermediate spaces between the frameworks D and D' are filled with the charge C forming permeable membranes. The heating of the furnace chamber is effected by metallic resistance E and $E_1$ for the furnace chamber A and $E_1$ and $E_2$ for the chamber B. These resistances are connected or disconnected with or from an electric current source according to need. The resistances lie on the bottom of the furnace and are covered by a layer of molten sodium silicate, which is initially supplied to the furnace and forms a bottom layer. Thereafter, as the silicate is formed this level is preserved and protects the conductors from the corroding effect of the furnace gases. The silicate layer heated by the electrodes preferably acts to heat the furnace by radiation, but if desired supplementary heating may be used, e. g. a gas or oil burner.

The temperature in the gas receiving and heating chamber A is maintained at about 1100° C. and in the chamber B at about 850° C.

As has already been stated, the intermediate space between the brick frameworks is filled with the charge which is formed into a wall or membrane and is continuously or intermittently supplied through the chute F. The charge, which, for example, consists of 1000 kg. sand and 450 kg. salt (NaCl), begins to melt together at a temperature of about 1100° C. and forms a skeleton immediately after it enters into the intermediate space. After about a quarter of an hour the formation of the skeleton is complete and the actual formation of silicate begins.

A certain excess of salt has previously been introduced into the chamber A. This salt floats above the silicate on the bottom of the furnace and is gasified little by little by the heat of the silicate. The water vapor is injected through pipes G into the furnace chamber A and is there mixed with the salt vapors. The water vapor is supplied at reaction temperature to chamber A or is heated to the desired temperature in chamber A and aids in vapourizing the chloride as well as maintaining its temperature or the temperature of the mixture at the required degree for reaction and for heating the membrane to the required reaction temperature. These vapors pass from the gas heating and delivery space A through the walls C of the charge, and the reaction between the components involved takes place. The silicate very soon begins to flow down from the brickwork and collects on the bottom of the furnace. While I have shown a plurality of membranes, one may be used or a battery consisting of as many as desired.

The provision of the gas delivery heating space or chamber A, it will be noted, (1) assures that the water vapor or mixture thereof with chloride vapors are present in sufficient volume and at the required temperature to enable a continuous process to be employed, (2) the gas is distributed and delivered to the membrane throughout the surface thereof, and (3) the temperature and pressure of the gas may be simply and flexibly controlled; in this connection, the pressure in chamber B may be reduced as desired to control the velocity at which the gas is presented to the membranes and permeates the same.

The salt vapors which have not participated in the reaction during the passage through the walls of the charge are condensed in the chamber B and thence flow into the chamber A, there to return to gas form and again pass through the walls of the charge. The water vapor which has not participated in the reaction leaves through the opening H and is condensed outside of the furnace. Hydrogen chloride accompanying the water vapor is absorbed in this condensate. To obtain 1000 kg. sodium silicate of the composition $Na_2O.3.5\ SiO_2$ about 500 kg. of vapor are consumed; to obtain 35% hydrochloric acid, slightly more vapor is usually necessary.

If so desired, the system can be reversed and the condenser chamber B used as the heating chamber and the chamber A as the condenser chamber. In this way the charge or charge walls can be attacked from the other side. The water vapor is then introduced through the pipes $G_1$, is allowed to pass through the walls C of the charge together with the salt vapors, and later to leave the furnace through the opening $H_1$. The silicate is removed from the furnace continuously from the seal I, which determines the depth of the sodium bath in the furnace.

In Figure 3 is shown a longitudinal section of another embodiment of the invention. In this furnace the charge or membrane is in the form of sloping separate heaps or barriers C forming division walls with the intermediate beams D—$D_1$. The charge floats on the bath and is supplied through the funnels F and $F_1$. The water and salt vapors are allowed to pass through the heaps or membranes, so that silicate and hydrogen chloride are formed. The excess of water vapor and the hydrochloric acid leave through the pipes H and $H_1$, in accordance with the direction of flow. The electric current is supplied in the same way as in the previous description. As will be noted, a gas heating and delivery space A is created on each side of the wall or barrier formed by the membrane and refractory beams.

This process and likewise with that previously described, can also be conducted so that only sand is fed in and forms the wall or membrane between the furnace chambers. In this case the salt is fed through a special opening, not shown, into the condenser chamber B and the salt melts and runs into the chamber A, where it is volatilized and together with the water vapor passes through the sand wall, which is changed to silicate.

The furnace can also be constructed in annular form and be operated in a manner similar to that of the usual annular furnaces.

The process according to the invention can also be so conducted that the partition or membrane between the heating and the condensing sides of the furnace, consisting of the charge, is placed horizontally or almost so, instead of vertically. This horizontal wall is obtained by allowing the charge to rest on one or more sets of grates, lying one beneath the other, of which the lowermost is placed at some distance above the surface of the bath, so that a gas heating and delivery space A is formed for the injected water vapor or mixture thereof with chloride vapors.

Another method of forming the charge wall is to let the furnace shaft become narrower in a downward direction like a funnel at that level where the charge wall is desired. To obtain the charge wall at this place, a perforated vault of pieces of silicate or silicon brick can be built, on which the charge is allowed to rest at first, but which little by little changes to silicate and disappears. This vault melts down very soon, but in the meantime the charge layer has changed into the hard, porous form, which has been designated skeleton, and which is strong enough to support itself and untransformed charge material located above it.

To elucidate the invention in these embodiments, reference is made to Figures 4 and 5 on the appended drawings.

Figure 4 shows a longitudinal section of a furnace, where the charge wall C is supported by a set of grates D and $D_1$. These grates can be replaced by a perforated vault. The plates are suitably constructed of ceramic material or even of metal. But in the latter case it is advisable to make the grate bars hollow, in order to allow cooling of the same. The operation of the furnace is as follows: Completely prepared silicate is present at A, whose surface is covered with a thin layer of molten alkali chloride. Water vapor is injected at G, where it is mixed with chloride vapors. The vapor mixture passes through the charge wall C, so that the reaction takes place and alkali silicate and hydrogen chloride are formed. The alkali silicate melts and drops into the chamber A. The hydrogen chloride proceeds, together with that part of the vapor mixture which has not yet participated in the reaction, into the condensing chamber B, where the alkali chloride vapors are condensed. The hydrogen chloride and the water vapor leave through the opening H. The alkali chloride descends through the charge where it may react or pass back to the chamber A, and be returned to gaseous form. A fresh charge is supplied through the funnel F, and the completely prepared silicate runs off through the seal I. As will be noted, the grates and charge are spaced above the bath A whereby the desired gas delivery heating space is created.

In Figure 5 I have shown a longitudinal section through a furnace where the charge wall has no other support than the furnace walls, constructed as an abutment. The vault of pieces of silicate or silicon brick erected at the front end of the furnace is indicated by a broken line $L—L_1$. Otherwise the designations are the same as in Figure 4.

The embodiment illustrated in Figure 6 is distinguished from the others chiefly by this fact alone, that the charge rests partly on perforated vaults or supports of metal or ceramic material and partly on the molten salt located at the bottom of the furnace.

The steam or water vapor is introduced through the pipes G and with chloride vapor enters the membrane or charge C surrounding the vaults through the perforations K.

A further form of the invention shown in Figures 7, 8 and 9, purposes a process for preparing alkali silicate from silicic acid-containing material (sand), alkali chloride, and water vapor, and is characterized mainly thereby, that the process takes place in an electric furnace, which furnishes heat for the reactions and at the same time produces the quantity of water vapor necessary for the reactions in direct proportion to the temperature prevailing in the furnace.

According to this form of the invention, the heating of the charge (sand and salt) occurs through radiation from an electrically heated silicate bath. The charge rests on a slitted vault of fire- and acid-proof material, so that an open space forming a gas heating and delivery chamber results between the vault and the silicate bath. The silicate bath is heated by an electric current, which traverses a suitable metallic resistance, wholly immersed in the silicate bath, so that it is entirely covered thereby, with the exception of the parts projecting outside of the furnace (attaching ends). In order that these attaching ends may not be oxidized, they must be cooled. The cooling is effected according to the invention by allowing the attaching ends to terminate, each in its own water container or steam boiler, which furnishes vapor for the process. The steam boilers are suitably secured by welding to the electric resistance, and the attaching ends, by reason of the water supply in the steam boilers, are maintained at a fairly low temperature. The water vapor thus formed is led through ducts into the open space of the furnace above the silicate bath, where the vapor is superheated to about 1100° C., to pass on through the slits to the charge. When the vapor enters the charge, the reaction begins between the substances involved, so that hydrochloric acid and alkali silicate are formed. The hydrochloric acid continues on its way through the charge, leaves the furnace and is collected. The alkali silicate passes in the other direction. By allowing the silicate formed to escape from the furnace continuously, the level of the silicate bath is kept constant. In order to increase the quantity of vapor, the silicate, when it leaves the furnace, is allowed to give up a part of its heat, for example, to one of the steam boilers, which can be provided with or constructed as a discharge chute, for the formation of water vapor, which is introduced into the furnace together with the rest of the vapor.

As concerns the composition of the charge, to prepare one ton of silicate of about 22% $NaO_2$ content, 780 kg. of sand and 415 kg. of salt are consumed, when it is a question of preparing sodium silicate.

Referring to Figures 7, 8 and 9, there is illustrated another embodiment of a device for applying the process according to the invention.

The furnace is divided by the perforated vault D into two chambers A and B. The furnace chamber A is heated by means of the metallic resistance $E—E_1$. At one side of the furnace the conductor leading to this resistance is enclosed by a container M serving as a steam boiler and at the other side by a container K constructed as a discharge chute. From the containers M and K, which are partially filled with water and therefore act as steam boilers, issue pipes G, through which the water vapor developed is injected into the furnace chamber A.

The charge or material for the membrane is introduced into the furnace chamber B through the funnels F. The water vapor injected into the furnace chamber A is superheated there and mixed with chloride vapors, then passing through the membrane C on the vault D where the reaction between the components involved occurs. The silicate thus obtained descends into the chamber A, while the hydrochloric acid formed during the reaction together with any excess of water vapor, leaves through the opening H.

The resistance E—E is metallically connected with the steam boilers M and K, for example, by welding. These boilers are provided with special cable connections N.

As the container K is constructed as a discharge chute, the prepared silicate, when it is discharged through the opening I, will deliver heat to the container, so that an extra amount of heat is obtained above that supplied by the electrode E.

When the alkali content has risen to about 20%, with any of the several apparatus and processes described herein, a silicate results which is relatively easy to melt, and which flows down into the silicate bath and is continuously removed as explained.

The furnace can be constructed as a three-phase furnace, with either delta coupling or star coupling.

In Figure 10, the charge C is supported by a vault or shelf D' adjacent the bath or can extend into the bath and be supported thereby or by the bottom wall of the furnace. The water vapor is introduced through the inlet G and the vapor mixture passes from the gas delivery and heating chamber A above the bath through the membrane C. The water vapor and hydrochloric acid gases will pass out through the superposed chambers B, formed by cavities in the wall of the furnace which, if desired, may be covered by a suitable grating. The gases pass from the furnace through the pipes $H_1$, $H_2$ communicating with the cavities or chambers B. The chloride vapors will be condensed in the membrane as they rise therethrough and will, of course, give up their heat to the charge. The throttle valve N in the outlet pipe $H_1$ may be partially or wholly closed in some cases to direct the flow of gases up through the charge to the outlet $H_2$ in order to promote condensation of chloride vapors as well as control the temperature of the charge by means of the heated gases passing therethrough. Electrodes are immersed in the silicate bath as with the other constructions and a sodium chloride layer or film forms the surface of the bath as heretofore described. The sodium silicate produced is carried off through the seal I.

The process is operable to form a large variety of salts and reaction compounds of the alkali (lithium, sodium, potassium) and alkali earth (calcium strontium barium) metals, e. g., ferrites, manganates, aluminates, borates, phosphates, etc. For example, if sodium chloride is made to act on zinc oxide under equivalent conditions, zinc chloride and sodium zincate are formed, of which the former leaves in gaseous form and is treated with water vapor or air, forming hydrochloric acid and zinc oxide, which may be returned to the process.

Similarly where sodium chloride and iron oxide are reacted, producing sodium ferrite, iron chloride and hydrochloric acid. The iron chloride and acid pass off as gases while the ferrite recovered when treated with water will form iron hydroxide and sodium hydroxide.

For the manufacture of double or polysilicates for instance, ordinary soda-lime glass, I add a calcium compound e. g., calcium silicate, calcium carbonate, or limestone either to the charge, or to the bath through the opening O in Figure 2, and the resultant reaction product in accordance with this invention will have a general molecular arrangement as follows:

$$xNa_2O \cdot yCaO \cdot 2SiO_2$$

This product is glass.

In the manufacture of glass I add borax ($B_2O_3$) or sodium tetraborate and lime to the membrane or to the bath and obtain as the reaction product hydrochloric acid and glass having the general molecular formula:

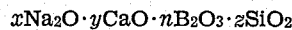
$$xNa_2O \cdot yCaO \cdot nB_2O_3 \cdot 2SiO_2$$

In a similar manner the reaction is carried out to form a wide variety of compounds or glass.

Where methane is used as a source of hydrogen, the methane is introduced into the chamber A and the temperature therein is such that the compound breaks down into carbon dioxide and free hydrogen which is presented to the membrane alone or as a mixture of chloride vapors in accordance with this invention.

In the manufacture of polysilicates, while I have mentioned calcium compounds, it is to be understood that I may use also zinc oxide and in fact any compound having the form RO wherein R represents any metal whose valence is 2.

I claim:

1. The process of preparing a product selected from a group consisting of alkali metal and alkali earth metal silicates and aluminates which comprises continuously reacting a compound containing the anion of the desired product while in substantially the form of a layer substantially completely exposed on one side thereof with a compound containing the cation of the desired product and a gas selected from a group consisting of hydrogen and oxygen containing gases and capable of entering into the reaction, the gas being passed into contact with the layer on its exposed surface and at elevated temperature, the reaction mixture being directly heated to such a temperature that the compounds will combine continuously at the exposed surface with the reaction proceeding in one direction to form the desired product in molten state and without opportunity for the reaction to move in the opposite direction, and continuously removing the molten reaction product as the same is formed and carrying on the reaction.

2. The process of preparing a product selected from a group consisting of alkali metal and alkali earth metal silicates and aluminates which comprises continuously reacting a compound containing the anion of the desired product while in substantially the form of a layer substantially completely exposed on one side thereof with a compound in gaseous state containing the cation of the desired product and a gas selected from a group consisting of hydrogen and oxygen containing gases and capable of entering into the reaction, the gas being passed into contact with the layer on its exposed surface and at elevated temperature, the reaction mixture being directly heated to such temperature that the compounds will combine continuously at the exposed surface with the reaction proceeding in one direction to form the desired product in molten state and without opportunity for the reaction to move in the opposite direction, and continuously removing the molten reaction product as the same is formed and carrying on the reaction.

3. The process of preparing a product selected from a group consisting of alkali metal and alkali earth metal silicates and aluminates which comprises continuously reacting a compound containing the anion of the desired product while in substantially the form of a layer substantially completely exposed on one side thereof with a compound in solid state containing the cation of the desired product and a gas selected from a group consisting of hydrogen and oxygen containing gases and capable of entering into the reaction, the gas being passed into contact with the layer on its exposed surface and at elevated temperature, the reaction mixture being directly heated to such a temperature that the compounds will combine continuously at the exposed surface with the reaction proceeding in one direction to form the desired product in molten state and without opportunity for the reaction to move in the opposite direction, and continuously removing the molten reaction product as the same is formed and carrying on the reaction.

4. The process of preparing sodium silicate which comprises continuously reacting silica while in substantially the form of a layer substantially completely exposed on one side thereof with a sodium compound and a gas selected from a group consisting of hydrogen and oxygen containing gases and capable of entering into the reaction, the gas being passed into contact with the layer on its exposed surface and at elevated temperature and the reaction mixture being directly heated to such a temperature that the compounds will combine continuously at the exposed surface with the reaction proceeding in one direction to form sodium silicate in molten state and without opportunity for the reaction to move in the opposite direction, and continuously removing the molten sodium silicate as the same is formed and carrying on the reaction.

ANDERS E. A. S. CORNELIUS.